UNITED STATES PATENT OFFICE.

WILLIAM EDGAR MUNTZ, OF LONDON, ENGLAND.

TREATMENT OF VULCANIZED INDIA-RUBBER GOODS EMBODYING A FOUNDATION FABRIC.

1,354,123. Specification of Letters Patent. Patented Sept. 28, 1920.

No Drawing. Application filed January 21, 1915. Serial No. 3,653.

*To all whom it may concern:*

Be it known that I, WILLIAM EDGAR MUNTZ, a subject of the King of Great Britain, and resident of 6 Bream's Buildings, Chancery Lane, London, England, have invented new and useful Improvements Relating to the Treatment of Vulcanized India-Rubber Goods Embodying a Foundation Fabric, of which the following is a specification.

The present application has reference to an invention supplementary to that which is the subject of an earlier application for a patent in the United States of America, Serial No. 819,773, filed February 19, 1914.

The prior application relates to an invention for treating the fabrics used as foundations in vulcanized India rubber goods and consists in impregnating such fabrics with a substance which has a greater affinity than this fabric for sulfurous or sulfuric acids either in fluid, anhydrous or gaseous form and can combine with and neutralize chemically the sulfurous and sulfuric acids or their anhydrids which I have found to be formed by the oxidation of the vulcanized rubber which substances or their products with these acids shall have no deleterious action either on the fabric or rubber or the process of vulcanization.

By means of the present invention I am able to treat finished or partly finished goods or those under repair so as either to prevent the formation of sulfurous and sulfuric acids or their anhydrids in the manufactured article, or to convert the sulfurous and sulfuric acids or their anhydrids as and when formed, into substances harmless to the foundation fabric without the fluid in which the rubber goods are immersed or its products with these acids being either prejudicial in any way to the rubber goods or deleterious at any time to the fabric, rubber, or process of vulcanization.

I accomplish this according to my invention by immersing the rubber goods, preferably under vacuum or pressure or both to insure its penetrating to all places to which the oxygen of atmospheric air can get access, particularly those coated with rubber on one side only, in either a gas or vapor such as ammonia or in any other gas or vapor which shall have a preferential affinity for these acids, such as the higher alkylamins capable of being vaporized or gasified at temperatures or by re-agents, neither such gas nor vapor nor its products with the acids having any prejudicial effects on the rubber goods nor having any deleterious action at any time on the fabric or rubber or process of vulcanization.

Or, in the alternative, I immerse the rubber goods in a fluid or solution preferably under vacuum or pressure or both such as a solution of ammonia or of a carbonate of an alkali or other substance capable of neutralizing these acids without this substance or its products with these acids having any prejudicial effects on the rubber goods or any deleterious action at any time on the fabric or rubber or process of vulcanization.

These substances include ammonia, the higher alkylamins, such as prophylamins, and solutions of any of the following substances:—

(1) Salts of bases with weak acids which are more or less soluble in water, such as the bicarbonates, formates and acetates of lithium, sodium, potassium, calcium, strontium, barium, magnesium, zinc and cadmium and the carbonates of lithium, sodium and potassium.

(2) Salts of strong bases with amphoteric oxids, such as the zincates and aluminates of lithium, potassium, and sodium.

Gaseous or liquid ammonia or ammonia in solution, the alkylamins and alkali carbonates or other substances capable of combining with sulfurous and sulfuric acids or their anhydrids (neither such substances nor their products with the acids being prejudicial to the rubber goods nor deleterious at any time to the fabric, rubber, or process of vulcanization) will prevent the formation of sulfuric acid by reason of the fact that the proximate product of the oxidation of vulcanized rubber is sulfurous acid or its anhydrid which, in presence of the alkaline substance mentioned, is immediately converted into a neutral sulfite which may or may not be subsequently oxidized to sulfate.

While it is believed that this is what occurs, it is quite possible that the oxidation of vulcanized rubber in presence of alkaline substances may result in the direct production of a neutral sulfite without intermediate formation of sulfurous acid.

As an example of the manner of carrying my invention into effect:—

I immerse the rubber goods in gaseous or liquid ammonia in a closed vessel at about 17° C. at a pressure of 7—15 atmospheres for any time exceeding 5 minutes. If a liquid alkaline solution is used it should be from 3% upward as indicated in the example in the application above referred to. It must be borne in mind that all these factors must necessarily depend in each case on the quality and make of the goods to be treated.

For instance thin mackintosh sheeting necessarily requires different conditions of treatment from thick rubber belting.

I may here remark that in order to insure thorough impregnation of the goods it is desirable in almost every case to apply the liquid or solution with the aid of vacuum or pressure or both; great pressure is desirable as above mentioned, and in the case of a vapor or a gas it is desirable to exhaust the closed vessel before admitting or creating the gas and then to apply the gas or vapor under the greatest convenient pressure.

Above I have described a mode of carrying out my invention when used for treating finished or partly finished goods or those under repair, i. e., by immersing them in a substance which neither itself nor its products with $H_2SO_3$ and $H_2SO_4$ shall at any time have any prejudicial effect on the rubber goods or any deleterious action on the fabric or the rubber or the process of vulcanization.

By means of the present invention I am also enabled to employ before, during or after manufacture the following additional processes and re-agents to attain the same results in the goods that is to say I may use:—

(1) Additive compounds of ammonia with certain salts, e. g., zinc sulfate or magnesium sulfate ammonia compounds, $(ZnSO_4, 5NH_3)$ $(MgSO_4, 5NH_3)$.

These additive compounds are either mixed with the rubber solution as "fillers" or impregnated into or deposited on to the foundation fabric or are formed *in situ* by treating the salts previously introduced into the components of vulcanized rubber goods with ammonia by immersion either before during or after vulcanization.

The salts in this latter case will be introduced by impregnating the fabric before manufacture, or the goods during or after manufacture with an aqueous solution of the salt, preferably under vacuum or pressure or both, or by mixing the anhydrous salt with the rubber mixture as a "filler" and the subsequent conversion of the salts into their additive compounds can then be effected by treating the goods with ammonia, in gaseous or liquid state or in solution, preferably under pressure.

These additive compounds may be used in any form but if dissolved in water or other solvent, the strength of solution may vary from 2 to 30% or even more.

(2) Acetic acid and other organic acids added to the rubber mixture or impregnated into or deposited on the fabric; to be afterward acted on by ammonia or other alkali.

The organic acids alluded to above are added in amounts from 2 to 20% to the original rubber mixture as a "filler" or to the rubber softened by addition of naphtha or other solvent while the ammonia or other alkali is used in excess preferably under pressure upon the finished goods or before or during vulcanization.

The ammonia may be either in liquid or gaseous form or in solution of any strength up to saturated solution (approx. 35% by weight) and the other alkalis may be used in solution in any convenient solvent of any strength from 2% to 20% or more and the gas or solution may be applied to the goods in any of the ways commonly used, under any pressure and at any temperature up to the temperature of vulcanization.

(3) Ammonia (as gas, liquid or in solution) and carbon dioxid (as gas or liquid) either applied together or by double treatment preferably in the order named, in equivalent molecular proportions, i. e., 2 volumes of ammonia to 1 volume of carbon dioxid preferably under pressure in a hermetically closed vessel.

As however the action of carbon dioxid is only "fixative" on the active re-agent ammonia, and in view of the proved efficiency of ammonia used alone especially during vulcanization under a pressure of 8 atmospheres and above, this re-agent may be used alone in any of its forms up to and including the finishing of the manufacture or generally on those goods under repair particularly during re-vulcanization.

As I have experimentally satisfied myself that ammonia under pressure opens up and permeates readily into the pores of the rubber and that it is retained therein subsequently for some months, it is clearly desirable that the pressure of application of these two re-agents should *pari passu* be the highest possible, without prejudice to the disintegration of the components of vulcanized rubber goods and without diminishing their cohesion to each other.

The pressures of application may therefore be for ammonia, under normal temperature, exceeding 8 atmospheres and carbon dioxid from 8 to 50 atmospheres, and the time of application from 5 minutes or less to 5 hours or more, both pressures and time of application varying for quality, density and thickness of materials treated.

The two re-agents if used in gaseous form will probably and most conveniently be obtained from cylinders of the compressed gas as ordinarily sold. Otherwise the ammonia may be produced by the action of heat on commercial ammonium carbonate or on a mixture of sodium carbonate and ammonium sulfate or by any other of the known methods. Similarly carbon dioxid may be produced by the complete combustion of anthracite or like material, though it is usually compressed into cylinders as a by-product at breweries.

Further materials which can combine with and neutralize chemically the $H_2SO_3$ and $H_2SO_4$ with formation of substances which have no deleterious action on the cellulose or other fabric or on the rubber include:—

1. A metallic powder such as zinc dust, magnesium powder, aluminium powder, and the like, which I propose to deposit on the fabric and not to use as a filling in the rubber mixture.

2. Cyanamids generally, such as calcium cyanamid, barium cyanamid and the like. Nitrids generally, especially such as are decomposed by water such as aluminium nitrid, magnesium nitrid, calcium nitrid, barium nitrid, zinc nitrid and the like. These substances are either mixed with the rubber or dusted on to the fabric during the manufacture of the goods. These substances by the action of acid or moisture yield ammonia which acts as a neutralizing agent and in the case of the nitrids also a metallic hydroxid which acts in a similar manner.

3. Ethylates and alcoholates generally, such as lithium ethylate, sodium ethylate, potassium ethylate, and the like; which, for the purpose of mixing with the rubber, possess the special advantage that on mixing an alcoholic solution of the alcoholate with the rubber solution the alcoholate is precipitated in an extremely fine state of division, its very intimate admixture with the rubber being thus secured: these may also be applied in solution to the fabric.

As an example of my invention the use of magnesium nitrid may be given.

To the "filling" ingredients of an ordinary rubber mixing about 5% to 20% or more of magnesium nitrid is added, the nitrid should be in the finest possible state of division. This mixture is then incorporated with the rubber in the ordinary way, i. e., either by mixing it with the untreated rubber in a suitable machine or by kneading it into rubber softened by the addition of a suitable solvent. The rubber mixture is then coated on to the fabric in the ordinary manner.

Through the whole process the dryness of all the solids and liquids used must be scrupulously maintained. It is usual to dry all the materials used in the preparation of a rubber mixture, but in this case special attention must be paid to this point.

What I claim and desire to secure by Letters Patent in the United States is:—

1. A process for neutralizing the sulfurous and sulfuric acids $H_2SO_3$ and $H_2SO_4$ and their anhydrous and gaseous forms, generated by the oxidation of the rubber in vulcanized rubber goods having a foundation fabric; which consists in subjecting the said goods to a suitable heat and treating them in a hermetically sealed chamber with undiluted ammonia gas, said treatment taking place under the greatest pressure possible without injury to the goods by disintegration or otherwise, whereby said gas is enabled to impregnate the rubber throughout, and then removing the heat and pressure so as to cause the said gas to remain imprisoned in the elastic pores of the rubber.

2. A process for neutralizing the sulfurous and sulfuric acids $H_2SO_3$ and $H_2SO_4$ and their anhydrous and gaseous forms, generated by the oxidation of the rubber in vulcanized rubber goods having a foundation fabric, which consists in subjecting the said goods to a suitable heat and treating them in a hermetically sealed chamber with undiluted ammonia gas subsequently subjected to the action of carbon dioxid, said treatment taking place under the greatest pressure possible without injury to the goods by disintegration or otherwise, whereby said gas is enabled to impregnate the rubber throughout, and then removing the heat and pressure so as to cause the said gas to remain imprisoned in the elastic pores of the rubber.

3. A process for neutralizing the sulfurous and sulfuric acids $H_2SO_3$ and $H_2SO_4$ and their anhydrous and gaseous forms generated by the oxidation of the rubber in vulcanized rubber goods having a foundation fabric which consists in treating said goods in a hermetically sealed chamber with a gaseous agent having a strong neutralizing activity, but no prejudicial effect on the fabric, rubber or process of vulcanization, said treatment taking place under the greatest pressure possible without injury to the goods by disintegration or otherwise, whereby said gas is enabled to impregnate the rubber throughout and then removing the pressure so as to cause the gas to remain imprisoned in the elastic pores of the rubber.

4. A process for neutralizing the sulfurous and sulfuric acids $H_2SO_3$ and $H_2SO_4$ and their anhydrous and gaseous forms generated by the oxidation of the rubber in vulcanized rubber goods having a foundation fabric, which consists in treating said goods in a hermetically sealed chamber with undiluted ammonia gas, said treatment taking place under the greatest pressure possible without injury to the goods by disintegration or otherwise, whereby said gas is enabled to impregnate the rubber throughout, and then removing the pressure so as to cause the gas to remain imprisoned in the elastic pores of the rubber.

5. A process for neutralizing the sulfurous and sulfuric acids $H_2SO_3$ and $H_2SO_4$ and their anhydrous and gaseous forms generated by the oxidation of the rubber in vulcanized rubber goods having a foundation fabric which consists in treating said goods in a hermetically sealed chamber with undiluted ammonia gas subjected to the action of carbon dioxid, said treatment taking place under the greatest pressure possible without injury to the goods by disintegration or otherwise, whereby said gas is enabled to impregnate the rubber throughout, and then removing the pressure so as to cause the gas to remain imprisoned in the elastic pores of the rubber.

6. A process for neutralizing the sulfurous and sulfuric acids $H_2SO_3$ and $H_2SO_4$ and their anhydrous and gaseous forms generated by the oxidation of the rubber in vulcanized rubber goods having a foundation fabric, which consists in associating with the components of the goods ingredients which are capable of emitting a gaseous re-agent which has a strong neutralizing activity but no prejudicial effect on the fabric, rubber or process of vulcanization.

In testimony whereof I have signed my name to this specification in the presence of two subscribing witnesses.

WILLIAM EDGAR MUNTZ.

Witnesses:
P. A. NEWTON,
A. D. DINSDALE.